Aug. 7, 1951  C. R. WILSON ET AL  2,563,440
THICKNESS GAUGE
Filed Jan. 21, 1948
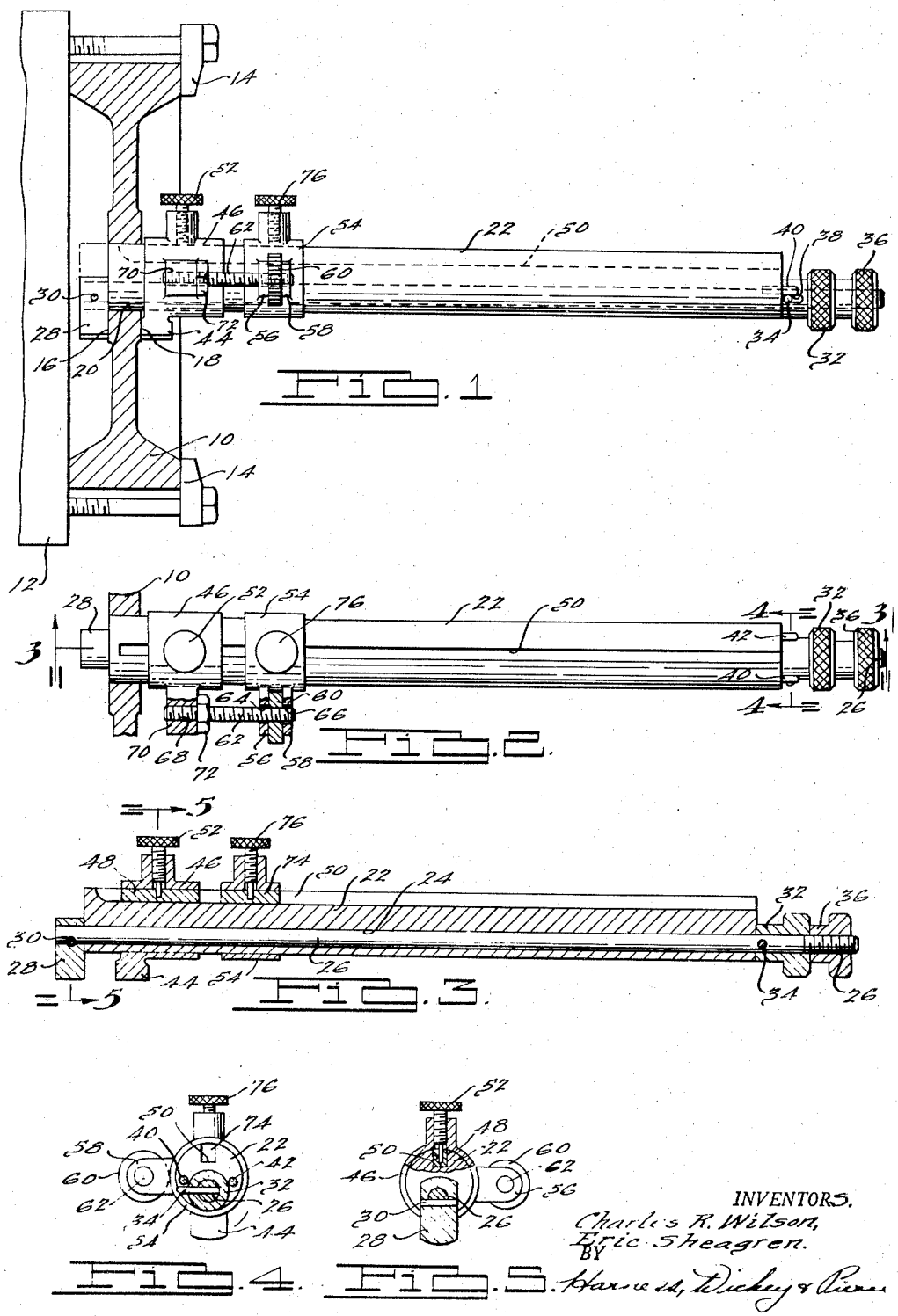
INVENTORS.
Charles R. Wilson,
Eric Sheagren.
BY
Harness, Dickey & Pierce
ATTORNEYS.

Patented Aug. 7, 1951

2,563,440

UNITED STATES PATENT OFFICE 2,563,440

THICKNESS GAUGE

Charles R. Wilson, Detroit, and Eric Sheagren, Berkley, Mich.; said Sheagren assignor to said Wilson Application January 21, 1948, Serial No. 3,644

7 Claims. (Cl. 33—143)

This invention relates broadly to new and useful improvements in measuring or gauging devices.

In many types of machining operations, dimensions must be held to a fine tolerance which are not readily accessible for measurement by conventional gauges. A typical operation is the thickness dimension across the center hole of a flywheel or the like. In this case, the thickness of the work across the center hole cannot be easily measured because of the remote position of the hole from the periphery of the work.

Moreover, when this dimension is measured by conventional gauges it usually is necessary to remove the workpiece from the machine in order to check the dimension. Manifestly, this is a tedious, wasteful, and time consuming procedure.

An important object of the present invention is to provide a gauge for measuring the thickness of a workpiece.

Another object of the invention is to provide a gauge of the above-mentioned character that is primarily adapted and pre-eminently suited for measuring the thickness of a workpiece in places which are not readily accessible to conventional gauging devices.

Still another object of the invention is to provide a thickness gauge that is compact and efficient in operation.

Other objects and advantages of the invention will be apparent during the course of the following description.

In the drawing forming a part of this specification and wherein like numerals are employed to designate like parts throughout the same, Fig. 1 is a side elevational view showing a gauge embodying the present invention applied to a workpiece in a typical measuring operation, the workpiece being shown in section to more clearly illustrate the manner in which the gauge is applied thereto;

Fig. 2 is a top plan view thereof;

Fig. 3 is a longitudinal, sectional view taken on the line 3—3 of Fig. 2;

Fig. 4 is a transverse sectional view taken on the line 4—4 of Fig. 2; and

Fig. 5 is a transverse sectional view taken on the line 5—5 of Fig. 3.

For purpose of illustration, we have shown in the drawing a flywheel 10 removably fastened to a machine 12 by a plurality of clamps 14 according to conventional practice. It will be assumed that the opposite surfaces 16 and 18 around the center hole 20 are being finish ground, and that it is necessary to hold the dimension between these surfaces to a fine tolerance. In this connection, it is to be understood that the setup here shown is for purpose of illustration only, and that it merely exemplifies a typical use for the gauge embodying the instant invention. In actual practice, of course, the gauge has other uses and can be employed in any capacity where a device of this character has utility.

The gauge here shown comprises an elongated cylindrical body 22 having an eccentrically disposed longitudinal bore 24 which receives a rockshaft 26. The rockshaft 26 projects from both ends of the body 22 and a jaw 28 is fastened on one end of the shaft by a cross pin 30. A knob 32 is fastened on the other end of rockshaft 26 by a cross pin 34, and a lock nut 36 is threaded on the rockshaft behind knob 32. Both the jaw 28 and knob 32 normally are held snugly against the ends of body 22 by lock nut 36 to prevent longitudinal movement of the rockshaft 26 relative to the body.

Since both jaw 28 and knob 32 are fastened to the rockshaft 26, the knob can be turned at one end of the body 22 to rotate the rockshaft and thus to move the jaw angularly at the other end of the body. Of course, it is necessary to loosen the lock nut 36 before the knob 32 can be manipulated in the above manner. After the jaw 28 has been turned to the proper angular position, the lock nut 36 can be tightened against the knob 32 to hold the jaw in the selected adjusted position. In this connection, it will be observed that cross pin 34 extends through an elongated slot 38 in the knob 32 to permit some longitudinal movement between the knob and the rockshaft and to render the nut 36 operative to lock the parts.

The jaw 28 is dimensioned so that it fits entirely within the periphery or outline of the body 22 when positioned as shown by broken lines in Fig. 1. However, by reason of its eccentric mounting on the body 22, the jaw can be made to project radially as shown by full lines in Figs. 1 and 3. Stop means in the form of pins 40 and 42 in the end of the body 22 adjacent knob 32 cooperate with a projecting terminal portion of cross pin 34 to limit angular movement of the knob, and consequently of the jaw 28, to 180°. When the cross pin 34 is against stop 40, jaw 28 projects radially from the body 22 as shown by full lines in the drawing, and when the pin is against stop 42 the jaw 28 is positioned entirely within the confines of the body as shown by broken lines in Fig. 1.

A cooperating jaw 44 is provided, which jaw has an integral collar 46 which fits over and slidably receives the body 22. The jaw 44 projects radially from the body 22 and is positioned angularly to oppose the jaw 28 when the latter occupies the full line position and the cross pin 34 is against stop 40. In this connection, it will be observed that jaw 44 is prevented from turning on the body 22 by a slide 48 which is disposed in a longitudinal slot 50 provided in the body. Also, it will be observed that the slide 48 fits snugly within the collar 46 and that it is locked to the collar by a thumbscrew 52. When thumbscrew 52 is loosened, the jaw 44 is readily adjustable longitudinally on the body and the thumbscrew can be tightened to hold the jaw in the selected adjusted position. During such longitudinal adjustment, however, slide 48 prevents the collar 46 and jaw 44 from rotating on the body 22.

In order to obtain a fine adjustment of the jaw 44 longitudinally on the body 22 and relative to the companion jaw 28, we provide a second collar 54 on the body, which collar has a pair of spaced laterally extending lugs 56 and 58 disposed in embracing relation to a thumbnut 60. A screw 62 threadedly received by the thumbnut 60 extends through openings 64 and 66 in lugs 56 and 58, respectively, and also is screwed into an internally threaded opening 68 provided in a lug 70 on the collar 46. A lock nut 72 on screw 62 normally is tightened against the lug 70 to prevent the screw from turning therein. Thus, the thumbnut 60 can be rotated to either advance or retract the screw 62 and consequently the jaw 44. A slide 74 is similarly positioned in guideway 50 and collar 54 to prevent the collar from rotating during longitudinal adjustment and a thumbscrew 76 carried by the collar can be tightened against the slide to hold the collar fixed on the body.

To adjust the jaw 44 axially on the body 22, thumbscrew 52 is loosened and thumbscrew 76 is tightened. Manipulation of thumbnut 60 then moves the collar 46 and consequently jaw 44 relative to the companion jaw 28. When the proper adjustment has been made, thumbscrew 52 is tightened to hold jaw 44 in the selected adjusted position.

To use the gauge in the situation here shown by way of illustration, the jaw 28 is moved to the dotted line position shown in Fig. 1 and then inserted through the center opening 20 in workpiece 10 to a position behind the rear annular surface 16. Manifestly, thumbscrews 52 and 76 are previously loosened and collars 46 and 54 positioned on the body 22 to permit full insertion of the jaw 28. When the jaw 28 is positioned behind the work 10, knob 32 is turned to swing the jaw to the full line position so that it extends radially across the annular surface 16, as shown. The two collars 46 and 54 are then advanced on the body 22 until the two jaws 28 and 44 snugly clamp the work. Thumbscrew 76 is then tightened; and, if necessary, the thumbnut 60 is manipulated to tighten jaw 44 against the work. Thumbscrew 52 is then tightened to hold jaw 44 in the finally adjusted position. The two jaws 28 and 44 then accurately measure the distance between surfaces 16 and 18. Lock nut 36 is then loosened and knob 32 is manipulated to return jaw 28 to the broken line position. As the jaw 28 swings angularly on the end of body 22, it disengages the work 10 and, when fully turned, can be readily withdrawn through the opening 20. After the gauge has been disengaged and removed from the work, jaw 28 is returned to the full line position and lock nut 36 is again tightened to assure an identical dimension between the two jaws which is readily measurable.

From the foregoing, it will be readily apparent that the gauge affords an easy, quick, and accurate means for measuring the thickness of materials. In a case like the one here given by way of illustration, the gauge can be used without removing the work from the machine 12 and thus expedites the entire finish grinding operation.

It is to be understood that the form of the invention herewith shown and described is to be taken as a preferred example of the same and that various changes in the size, shape and arrangement of parts may be resorted to without departing from the spirit of the invention or the scope of the appended claims.

Having thus described the invention, we claim:

1. A thickness gauge comprising an elongated body having a longitudinal eccentrically disposed bore, a pair of cooperative jaws, one jaw disposed at one end of the body and the other jaw longitudinally adjustable on the body, and a rockshaft in said bore carrying the jaw which is disposed at the end of the body.

2. A thickness gauge comprising an elongated body having a longitudinally eccentrically disposed bore; a pair of cooperative jaws, one jaw disposed at one end of the body and the other jaw longitudinally adjustable on the body; a rockshaft in said bore carrying the jaw which is disposed at the end of the body; a manual actuator on said rockshaft; and stop means for checking rotative movement of the rockshaft when said jaws are disposed in opposed relation with respect to each other.

3. A thickness gauge comprising an elongated body having a longitudinal eccentrically disposed bore; a pair of cooperative jaws, one jaw disposed at one end of the body and the other jaw longitudinally adjustable on the body; a rockshaft in said bore carrying the jaw which is disposed at the end of the body; a manual actuator on said rockshaft; stop means for checking rotative movement of the rockshaft when said jaws are disposed in opposed relation with respect to each other; and means for locking said rockshaft against rotation.

4. A thickness gauge comprising an elongated body having an eccentrically disposed longitudinal bore; a jaw at one end of the body; a rockshaft journaled in said longitudinal bore and carrying said jaw, said rockshaft operative to move the jaw angularly on the end of the body, said jaw shaped so as not to project radially from the body in one position of the rockshaft and to project radially therefrom in another position of the rockshaft; a second radially projecting jaw carried by the body and arranged to be opposite said first jaw in a radially projecting position of the latter; and stop means for limiting angular movement of said first jaw so that it is movable only between said mentioned positions.

5. A thickness gauge comprising an elongated body member having a longitudinal eccentrically disposed bore; a rockshaft in said bore; a jaw fixed on the end of said rockshaft; and a second jaw mounted for longitudinal adjustment on the body disposed to oppose said first jaw in one position thereof.

6. A thickness gauge comprising an elongated body member having a longitudinal eccentrically disposed bore; a rockshaft in said bore; a jaw fixed on the end of said rockshaft; a second jaw mounted for longitudinal adjustment on the body disposed to oppose said first jaw in one position thereof; and means for holding said second jaw in a selected adjusted position on the body.

7. A thickness gauge comprising an elongated body member having a longitudinal eccentrically disposed bore; a rockshaft in said bore; a jaw fixed on the end of said rockshaft; a second jaw mounted for longitudinal adjustment on the body disposed to oppose said first jaw in one position thereof; manually operable means for adjusting said second jaw longitudinally on the body; and clamp means for holding said second jaw in a selected adjusted position on the body.

CHARLES R. WILSON.
ERIC SHEAGREN.

REFERENCES CITED

The following references are of record in the file of this patent:

UNITED STATES PATENTS

| Number | Name | Date |
|---|---|---|
| 455,644 | Sloane | July 7, 1891 |
| 517,073 | Sloane | Mar. 27, 1894 |
| 846,607 | Peddycoart | Mar. 12, 1907 |
| 1,110,879 | Brown | Sept. 15, 1914 |
| 1,375,747 | Zigray | Apr. 26, 1921 |
| 2,293,411 | Spillman | Aug. 18, 1942 |
| 2,295,783 | Greenleaf | Sept. 15, 1942 |
| 2,311,323 | Addis | Feb. 16, 1943 |
| 2,470,498 | Lankford | May 17, 1949 |

FOREIGN PATENTS

| Number | Country | Date |
|---|---|---|
| 116,377 | Switzerland | Jan. 3, 1927 |
| 216,190 | Switzerland | Nov. 17, 1941 |
| 273,972 | Italy | May 7, 1930 |
| 556,532 | Great Britain | Oct. 8, 1943 |
| 738,779 | France | Dec. 29, 1932 |